W. N. WHITELEY, W. BAYLEY & S. DYER,

Assignors to WHITELEY, FASSLER & KELLY.

KNOTTING DEVICE FOR GRAIN BINDERS.

No. 10,797. Reissued Jan. 11, 1887.

Witnesses:
Oscar E. Perrigo
F. B. Furniss

Inventors:
William N. Whiteley
William Bayley
Samuel Dyer

N. PETERS, Photo-Lithographer, Washington, D. C.

W. N. WHITELEY, W. BAYLEY & S. DYER,

Assignors to WHITELEY, FASSLER & KELLY.

KNOTTING DEVICE FOR GRAIN BINDERS.

No. 10,797. Reissued Jan. 11, 1887.

Witnesses:

Oscar E. Perigo,

F. B. Furniss

Inventors:

William N. Whiteley

William Bayley

Samuel Dyer

N. PETERS, Photo-Lithographer, Washington, D.C.

W. N. WHITELEY, W. BAYLEY & S. DYER,

Assignors to WHITELEY, FASSLER & KELLY.

KNOTTING DEVICE FOR GRAIN BINDERS.

No. 10,797. Reissued Jan. 11, 1887.

Witnesses:
Oscar E. Perrigo
F. B. Furniss

Inventors:
William N. Whiteley
William Bayley
Samuel Dyer

N. PETERS, Photo-Lithographer, Washington, D. C.

4 Sheets—Sheet 4.

W. N. WHITELEY, W. BAYLEY & S. DYER,

Assignors to WHITELEY, FASSLER & KELLY.

KNOTTING DEVICE FOR GRAIN BINDERS.

No. 10,797. Reissued Jan. 11, 1887.

Witnesses:

Oscar E. Perrigo

F. B. Fenner

Inventors:

William N. Whiteley

William Bayley

Samuel Dyer

N. PETERS, Photo-Lithographer, Washington, D. C.

UNITED STATES PATENT OFFICE.

WILLIAM N. WHITELEY, WILLIAM BAYLEY, AND SAMUEL DYER, OF SPRINGFIELD, OHIO, ASSIGNORS TO WHITELEY, FASSLER & KELLY, OF SAME PLACE.

KNOTTING DEVICE FOR GRAIN-BINDERS.

SPECIFICATION forming part of Reissued Letters Patent No. 10,797, dated January 11, 1887.

Original No. 333,907, dated January 5, 1886. Application for reissue filed January 28, 1886. Serial No. 190,113.

*To all whom it may concern:*

Be it known that we, WILLIAM N. WHITELEY, WILLIAM BAYLEY, and SAMUEL DYER, all of Springfield, in the county of Clark and State of Ohio, have invented certain new and useful Improvements in Knotting Devices for Grain-Binders in the Automatic Binding of Sheaves of Grain; and we do hereby declare that the following is a full and accurate description of the same, reference being had to the accompany drawings, wherein—

Figure 1:
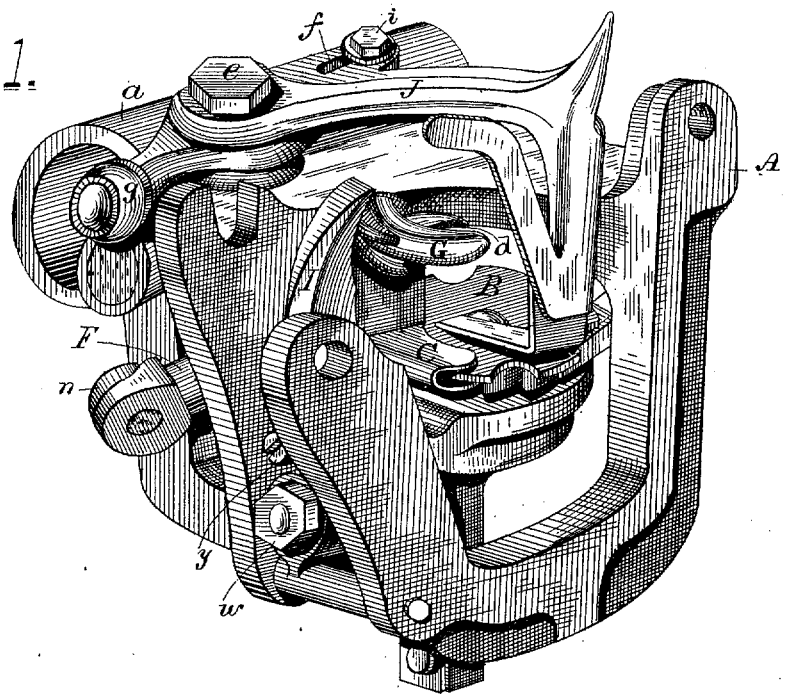
Figure 7:
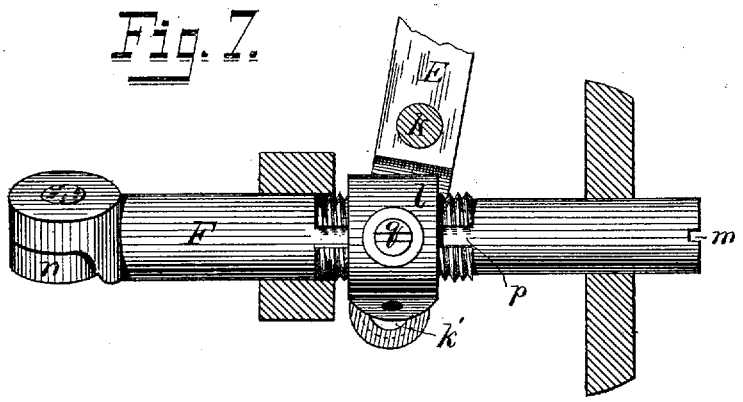
Figure 2:
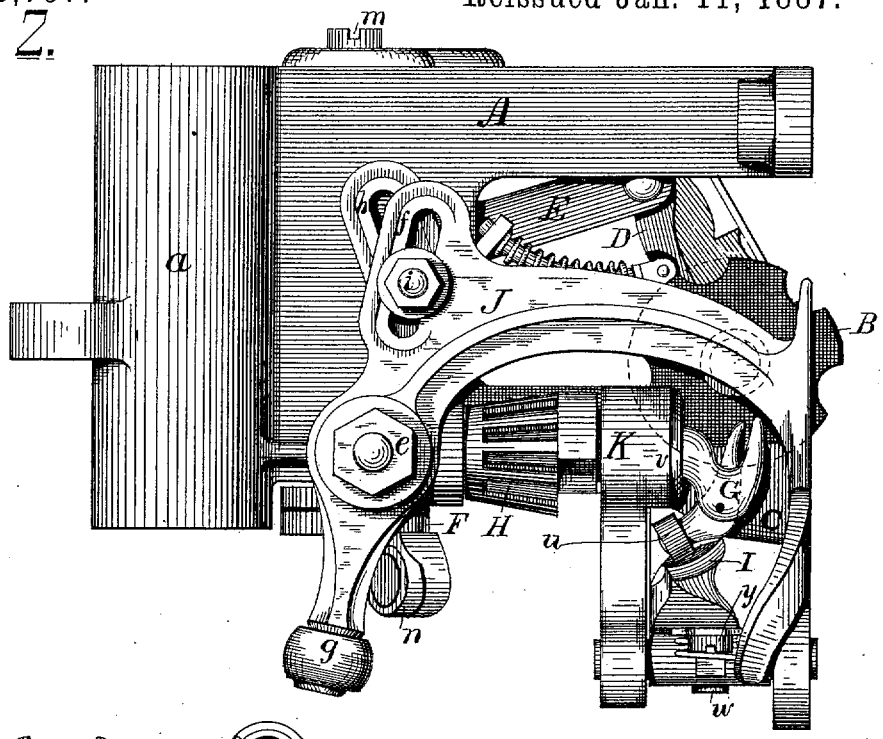
Figure 5:
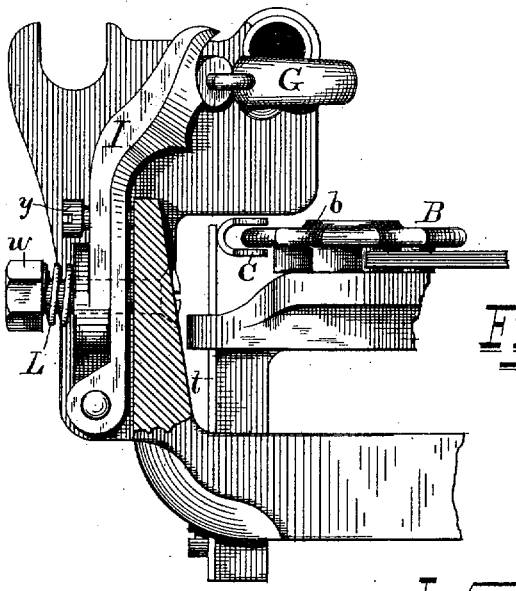
Figure 3:
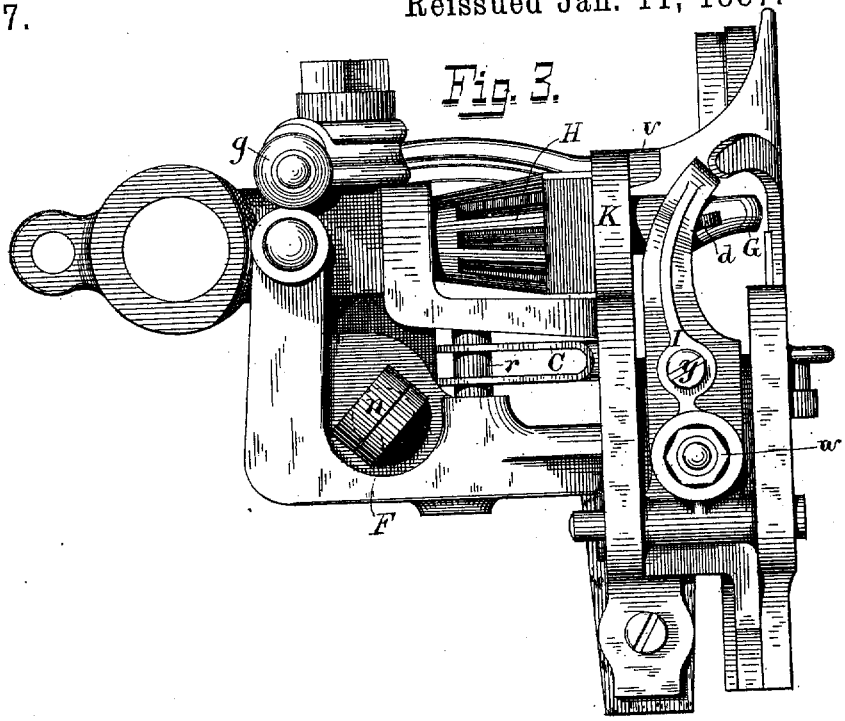
Figure 4:
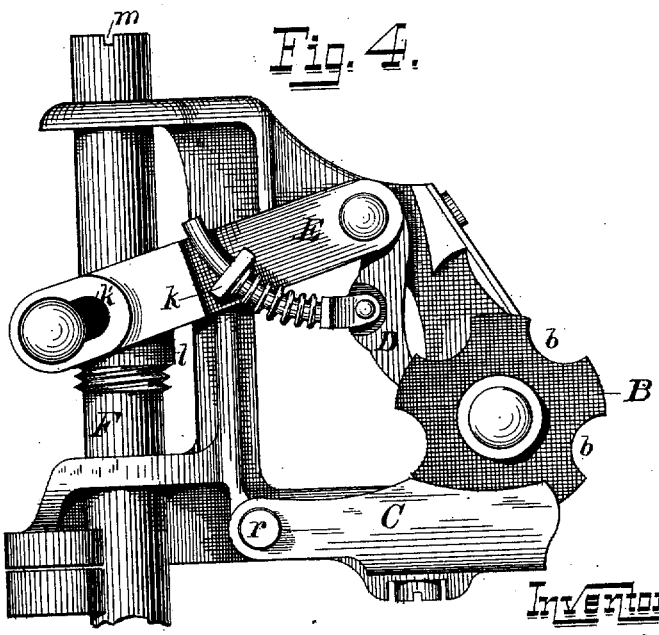
Figure 6:
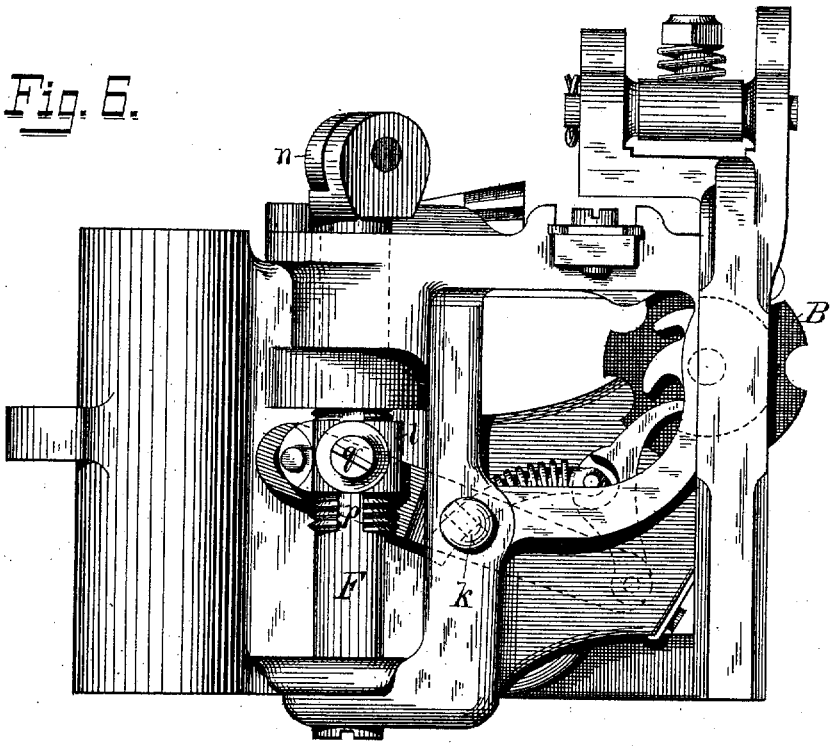

Figure 1 is a perspective view from the under side of our knotter, showing a part of our invention. Fig. 2 is a front elevation of the same. Fig. 3 is an end elevation. Fig. 4 is a front elevation of the cord-holding device. Fig. 5 is a bottom view of the knotting and cord-holding device. Fig. 6 is a rear elevation of the knotter. Fig. 7 is a detached view of the adjustable plunger-rod.

Similar letters refer to like parts in the several views.

The general structure and mode of operation in handling the cord and forming the knot is not new with us, and we do not propose to claim more than the particular improvements hereinafter noted, to wit: Our improvements relate, first, to the stripper which strips the cord off the knotting-hook, the said stripper being made in two parts, whereby it is rendered adjustable; second, to the adjustable plunger-rod whereby the cord-holding disk is operated, the adjustable plunger-rod having a screw-adjustment which may be operated by a screw-driver applied to a slot formed in the end of the rod; third, to the U-shaped cord-holder shoe which embraces the edge of the cord-holding disk, the said U-shaped cord-holder shoe being formed in one piece and elastic; and fourth, to the pivoted spring-cam which closes the knotter-hook, the spring-cam being pivoted in rear of the knotter-hook and provided with a spring and an adjustable stop.

A is the frame which supports the operative mechanism of the knotter. The sleeve *a*, which is a part of the frame A, encircles the main shaft of the knotting mechanism, the shaft being journaled in the frame of the binder. The knotter is properly braced and held in position in reference to the other parts of the binder in the usual manner.

B is the rotating cord-holding disk whereby the end of the cord is held. The edge of said disk is notched, as at *b*, to insure a proper seizure of the cord, which is gripped and held by being caught in one of the notches, *b*, and carried and jammed into the U-shaped cord-holder shoe C, which is folded over so as to inclose the edges of the cord-holding disk B for that purpose. The disk B is caused to rotate automatically by the pawl D, operated by the lever E and adjustable plunger-rod F, which receives its motion from the usual revolving cam and gear-wheel for operating the knotter, which gear-wheel is not shown.

G is the knotter-hook, with the pivoted tongue *d*. The knotter-hook G is actuated by the pinion H, and the tongue *d* is caused to close at the proper moment by the spring-cam I.

When the knot has been formed, the stripper J, swinging upon its pivot *e* and actuated by engagement of its friction-roller *g* with a cam-groove in the gear-wheel for operating the knotter, (the gear-wheel not being shown,) strips the loop of the knot off the knotter-hook and thereby releases the sheaf.

The particular improvements will now be more minutely described. The stripper J requires an adjustment at its free end to bring it to the exact point with reference to the knotter-hook G, where its action will be the most efficient, because a slight misadjustment will tend to cause a misformation of the knot and a failure to perform the intended function of the machine. The stripper J is therefore made in two parts, both of which are pivoted on the bolt *e* and provided, respectively, with intersecting slots *f h* and a connecting-bolt, *i*, which may be adjusted to any point in said slots, and thereby correspondingly vary the relative position of the roller *g* and free end of the stripper J. It is also necessary to adjust the pawl D as to the ratchet-teeth attached to the cord-holding disk B, so as to secure a movement of said disk proper to carry the cord not only into the U-shaped cord-holder shoe C, but also the exact position required. The pawl D is jointed to the lever E, and said lever is pivoted upon the frame A at *k*, and is actuated by its slotted connection *k'* with the screw-sleeve *l* upon the adjustable plunger-rod F. The screw-sleeve *l* may be moved back and forth by rotating the said adjustable plunger-rod F, and to enable the attendant to shift the adjustment of said sleeve with the lever E and pawl D a notch, *m*, is formed in the end of the adjustable plunger-rod F for the ready and efficient application of a screw-driver for that purpose; but, as it is necessary that the friction-roller *n* shall always maintain its plane of revolution, a groove, *p*, is cut across the screw-threads on the adjustable plunger-rod F to receive the end of the set-screw *q*, and said groove and set-screw thereby determine the position of said roller, and prevent any shifting of the same while the parts are in action. The cord-holding disk B seizes the cord and folding it over its edge carries the part so folded between the sides of the U-shaped cord-holder shoe C, where said cord is jammed between the surfaces of said disk and holder-shoe; but, as the cord employed with grain binders is liable to vary greatly in size and quality, the action of this gripping and clamping device is liable to correspondingly vary unless a proper elasticity be provided in the U-shaped cord-holder shoe C, and this elasticity we provide by forming said holder-shoe of a single piece of sheet metal, preferably steel, folded over so as to present the required U shape in cross-section. The sides of this holder-shoe may then yield and spread a little to accommodate cord of unusually large size. The U-shaped cord-holder shoe C is pivoted to the frame A by the pin *r*, and is kept up to a working position by the spring *t*.

The knotter-hook G is rotated by means of the pinion H, and its tongue *d* is extended through the back of said hook past its pivot, and is provided with a friction-roller, *u*. As the hook is rotated, this roller travels on the cam or track extension *v* of the housing or box K, in which the shaft of said hook revolves. This causes the tongue *d* to open and remain so until, in its revolution, the tongue has received the cord to be seized and held. The roller *u* then passes off the track *v* and under a cam formed on the arm I, pivoted on the frame, which causes the tongue *d* to close upon the cord. As the cord is liable to vary in size and also to present itself in an unfavorable position in the knotter-hook G, undue strains are encountered when the closing-cam of the tongue *d* is rigid. We have therefore placed the closing-cam upon the arm I, which is pivoted at one end to the frame, and is provided with a stiff spring, L, which will hold the closing-cam up with sufficient force to insure gripping and holding the cord, and yet will yield slightly when the cord is greater than the usual size. The tension of the holding-spring L may be regulated by the nut W, and the forward movement of the arm I may be limited by the stop-screw *y*.

Having now described our improvements, we claim as new—

1. The stripper J, made in two parts, capable of adjustment as to each other, whereby the position of the free or stripping end of said lever may be adjusted, substantially as set forth.

2. The stripper J, made in two parts, both pivoted upon the bolt *e* and provided with intersecting slots *f h* and the connecting-bolt *i*.

3. The combination of the pivoted lever E, carrying the pawl D, whereby the cord-holding disk B is actuated, connected with the sleeve *l* by a slot, *k*, in its end, said sleeve *l* fitted upon the adjustable plunger-rod F, having a screw-thread thereon and provided with a notch, *m*, at its outer end, whereby a tool may be applied to revolve said rod, and thereby change the position thereon of the sleeve *l*, for the purposes set forth.

4. The cord-holding disk B, with the notches *b*, combined with an elastic U-shaped cord-holder shoe, C, attached at its end to the frame, so that both edges are free to expand to embrace the edge of said disk, whereby a portion of the band-cord will be carried by the disk into said shoe at one end and discharged from the same at the other end, as and for the purposes set forth.

5. The elastic U-shaped cord-holder shoe C, constructed of a single piece of sheet metal, pivoted to the frame by the pin *r*, combined with the spring *t* and notched disk B.

6. The folded U-shaped cord-holder shoe C, constructed from a single piece of sheet metal, attached at its end to the frame, whereby both edges are free to expand, as and for the purposes set forth.

7. The revolving knotter-hook G and its pivoted tongue *d*, combined with an arm, I, pivoted at one end to the frame and having its free end fashioned to act as a closing-cam for the tongue *d*, and the adjustable tension-spring L, substantially as set forth.

WILLIAM N. WHITELEY.
WILLIAM BAYLEY.
SAMUEL DYER.

Witnesses:
OSCAR E. PERRIGO,
F. B. FURNISS.